(No Model.)
G. RICHARDSON.
PIPE JOINTER.
No. 578,422.  Patented Mar. 9, 1897.
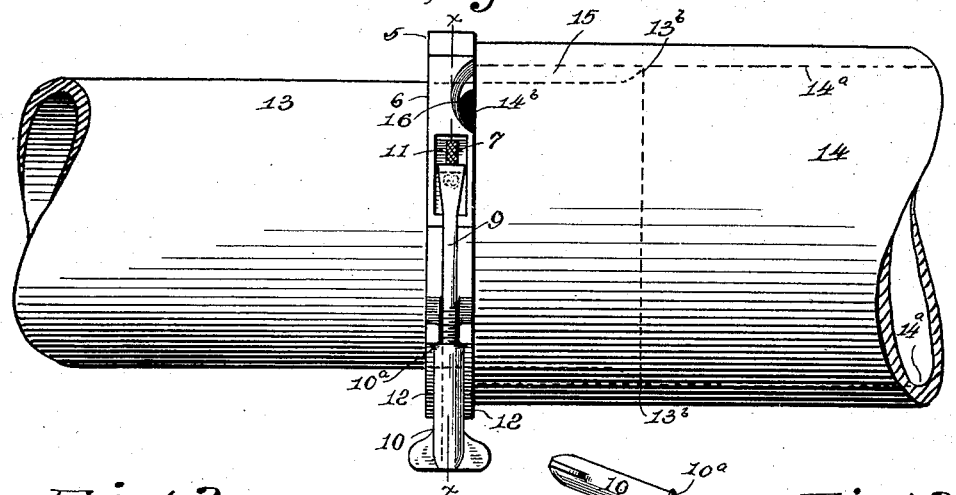
WITNESSES
H. H. Lamb
A. R. Lacy
INVENTOR
George Richardson
By his Atty.
Geo. D. Phillips

UNITED STATES PATENT OFFICE.

GEORGE RICHARDSON, OF BRIDGEPORT, CONNECTICUT.

PIPE-JOINTER.

SPECIFICATION forming part of Letters Patent No. 578,422, dated March 9, 1897.

Application filed March 28, 1896. Serial No. 585,214. (No model.)

*To all whom it may concern:*

Be it known that I, GEORGE RICHARDSON, a citizen of the United States, and a resident of Bridgeport, in the county of Fairfield and State of Connecticut, have invented certain new and useful Improvements in Pipe-Jointers, of which the following is a specification.

My invention relates to a jointer-tool for sealing the joints of water-mains or pipes of like character.

To enable others to fully understand my invention, reference is had to the accompanying drawings, in which—

Figure 1 represents two sections of pipe with their ends telescoped and the jointer-tool in position to seal the joint. Fig. 2 is a side elevation of the jointer closed. Fig. 3 is a side elevation of the jointer partially open. Fig. 4 is a longitudinal sectional view of the jointer through line $x$ of Fig. 1. Fig. 5 is a detail sectional view of one of the segments.

Its construction and operation are as follows:

The jointer is composed of a series of segmental pieces—viz., 1, 2, 3, 4, 5, and 6. This number may be increased or diminished as desired. The inner curve of the segmental pieces or blocks will conform to the outer circumferential surface of the pipe they are intended to embrace. Therefore these curves will vary according to the size of the pipe, so that when the jointer is clamped about a pipe, as shown at Fig. 1, the segments will conform to the outer surface of such pipe to make substantially a close fit, sufficiently so, at least, for the purpose desired. The several segments I prefer to make hollow, as shown at Fig. 4, so as to exclude dirt or solder, and in the end walls $a$, Fig. 5, holes $b$ are drilled to receive the flexible wire cord 7. This cord is firmly anchored to the pin 8 or by any other suitable means, and the opposite end of such cord is attached to an offset of the binder extension 9, while the threaded end of such binder extension is threaded to receive the interiorly-threaded handle 10. The opening 11 (see also Fig. 1) is formed through the outer surface or shell of the segment 6 to permit of a longitudinal movement of said binder extension, for the purpose hereinafter to be more fully described. Mounted upon the opposite segment 1 is the bifurcated lug 12 to admit the free end of the said binder extension, while the shoulder $10^a$ of the handle 10 will engage with the perpendicular face of the lug 12, so as to bind such segments firmly together, as shown at Figs. 1 and 2.

13 and 14 represent pipes of a water-main, and to connect them firmly together to prevent leakage of the joint the smaller pipe is inserted within the larger far enough to admit of sufficient solder between the outer circumference of the smaller pipe and the inner circumference $14^a$ of the larger, as represented by the circumferential space 15, to form a tight joint. The end of the pipe 13 is provided with the swell $13^b$, which practically fills the inner diameter of the larger pipe 14. The jointer is then clamped about the smaller pipe with the perpendicular faces of the several segments resting against the end $14^b$, as shown at Fig. 1. The circumferential groove 16 is formed in the perpendicular face of one of the segments, which in this case is shown in the segment 6. This makes an aperture through which the molten solder is poured to fill the space 15, which solder, instantly solidifying, will make a firm and liquid-tight joint. The jointer is then removed for further use.

The jointer, as above described, is better adapted for the purpose than anything heretofore constructed. In most cases a clay dam is formed at the mouth of the large pipe, which is very unsatisfactory, owing to the tendency of the molten metal to blow when brought in contact with the wet clay. A wooden band has also been employed for this purpose, but this will not conform to the irregular surface at the end of the large pipe, so that solder is liable to escape; neither will such band fit closely the smaller pipe, thus affording other avenues of escape for the liquid solder. Aside from these serious objections urged against a wood band it is short lived by reason of its contact with the molten solder which soon destroys it.

My device is made of metal, therefore indestructible so far as the use to which it is put is concerned. It is made in short sections, each section fitting but a small portion of the outer circumference of the pipe, thus insuring a close contact on such outer surface. The several sections are tied or held together by a flexible binder, which, being brought in contact with the ends only of the segments, will serve to keep each segment firmly and independently held and made to conform not only to the circumference of the smaller pipe, but also to any inequalities existing in the end of the larger pipe as well. This flexible binder allows the jointer to be opened, so as to form a straight line which enables it to be passed beneath a pipe where little room exists.

It will be readily understood that any flexible binder can be used besides a wire rope or cord, as a chain or other like means could be employed with equal advantage.

I do not wish to be strictly held to the means shown for connecting the free ends of the jointer together, so as to form a continuous ring or circle, such, for instance, as the binder extension 9, as other well-known means could be employed with equal advantage.

Having thus described my invention, what I claim as new, and desire to secure by Letters Patent, is—

1. A jointer-tool, of the character described, consisting of a series of three or more segmental blocks whose inner curved surfaces are adapted to fit, substantially, the outer cylindrical surface of a pipe, an independent flexible binder on which said blocks are loosely strung, one end of said binder anchored to the free end of said jointer and means connected to the opposite end of said binder whereby all of the blocks are made to conform to the outer surface of a pipe combined with means for locking the jointer, substantially as set forth.

2. A jointer-tool, comprising, in combination, a series of segmental blocks, each of which blocks is made hollow and has end walls provided with holes; a flexible binder passing through said holes; one end of said binder anchored to the free end of said jointer, and means connected to the opposite end of such binder so that all of said segmental blocks may be made to conform to the outer cylindrical circumference of a pipe, for the purpose specified.

3. A jointer-tool of the character described, comprising, in combination, a series of segmental blocks whose inner curved surfaces are adapted to conform to the outer cylindrical surface of the smaller of two pipes, telescoped together, while one of the vertical faces of the segmental blocks abuts the end of the larger pipe; a flexible binder extending longitudinally through the several segmental blocks, and means for locking them to the pipe, for the purpose described and set forth.

Signed at Bridgeport, in the county of Fairfield and State of Connecticut, this 13th day of March, A. D. 1896.

GEORGE RICHARDSON.

Witnesses:
WILLIAM R. PALMER,
LEWIS F. PELTON.